United States Patent [19]
Novosad

[11] 3,948,533
[45] Apr. 6, 1976

[54] COMPOSITE RING MADE OF PRESS FITTED PARTS AND METHOD OF ASSEMBLING

[75] Inventor: Eugene W. Novosad, Arlington Heights, Ill.

[73] Assignee: Crane Packing Company, Morton Grove, Ill.

[22] Filed: Feb. 27, 1975

[21] Appl. No.: 553,451

[52] U.S. Cl. ............................ 277/81 R; 277/235 R
[51] Int. Cl.² .......................................... F16J 15/34
[58] Field of Search ................ 277/81 R, 181–184, 277/235 R, 235 A, 236

[56] References Cited
UNITED STATES PATENTS

| | | | |
|---|---|---|---|
| 3,015,504 | 1/1962 | Fulton et al. | 277/81 R |
| 3,116,066 | 12/1963 | Koppius | 277/81 R |
| 3,770,181 | 11/1973 | Stahl | 277/81 R |

Primary Examiner—Robert I. Smith
Attorney, Agent, or Firm—Charles F. Voytech

[57] ABSTRACT

The invention disclosed is a composite ring made of press-fitted parts and method of assembling concentric articles having an interference fit, the inner one of which has a surface of a granular material such as ceramic, the method eliminating the customary heat shrinking step by which the outer one, usually of metal, is heated and expanded over the inner one and then cooled to shrink it tightly over the inner one. According to the method disclosed, the ceramic surface is coated with a polyetetrafluoroethylene lubricant and then pressed into the outer one without the use of heat. A mating ring for rotary mechanical end face seals, wherein the mating ring is formed of a ceramic ring pressed into a metal supporting stamping, is also disclosed.

8 Claims, 9 Drawing Figures

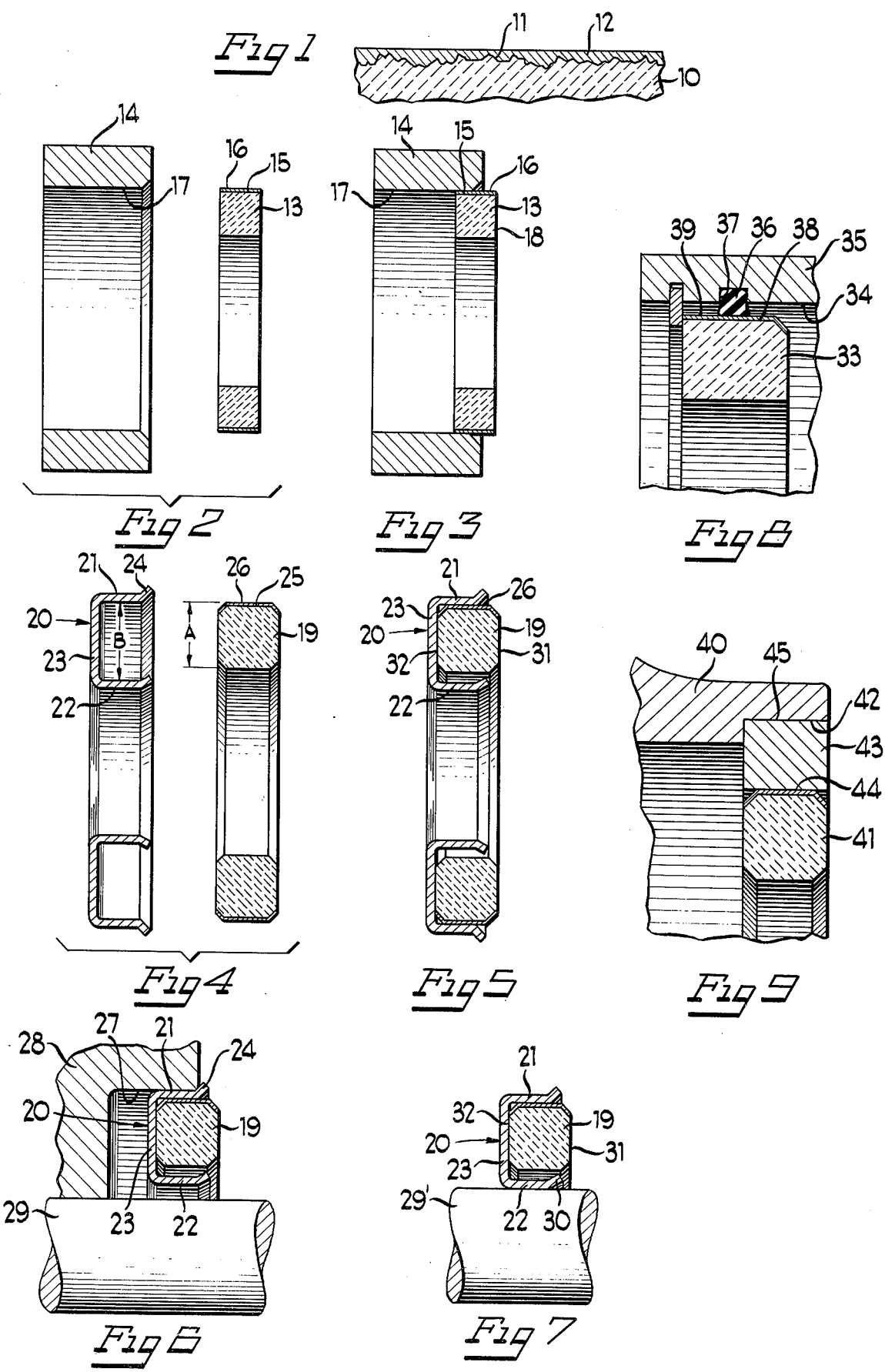

COMPOSITE RING MADE OF PRESS FITTED PARTS AND METHOD OF ASSEMBLING

This invention relates to a method of press-fitting an article made of a granular substance into a metal article and to an article of manufacture made by this method. For purposes of illustration, this invention will be disclosed with reference to its application to the method of press-fitting a ceramic mating ring of a rotary mechanical seal into a metal ring or cavity.

In the rotary mechanical end-face seal art it is at times required that a primary seal ring of rigid material be made to bear in an axial direction with a fluid-tight fit against a mating seal ring of a different rigid material. The two materials will vary with the fluid, temperature and pressure conditions existing around the rings. One very large field in which rotary mechanical end-face seals are used is that of the water pumps for internal combustion engines wherein the fluid is a mixture of water and an antifreeze retained in the cooling system of the engine under pressure of 10 to 15 pounds per square inch and at temperatures above 212°F.

For the above conditions, the primary seal ring may be made of a phenolic material and the mating ring may be a ceramic material. The primary seal ring is flexibly sealed by a secondary seal of rubber or the like to a metal retainer which is pressed into a cavity in the engine block surrounding the pump shaft, and the mating ring is frictionally held against the hub of the pump impeller which may be rotating at various speeds reaching approximately 4 thousand r.p.m.

Thus the rotating ceramic mating ring is subjected to temperatures exceeding 212°F. at speeds of four thousand r.p.m., and the resulting combination of heat expansion and centrifugal force may cause the ceramic mating ring to crack and explode.

To prevent the cracking and explosion of the ceramic mating ring it has been proposed to confine the ceramic mating ring within a metal band which fits over the ring with an interference fit to exert a continuous radially inwardly directed pressure upon the ring in opposition to the radially outwardly directed centrifugal and heat expansive forces in the ring. This created an assembly problem in that the metal band had to be heated to expand it over the ceramic mating ring and then cooled to shrink it against the ceramic, thereby generating the continuous, radially inwardly directed force needed to counteract the centrifugal and heat-expansive forces. The heating and cooling steps are obviously undesirable from a manufacturing standpoint.

It has been proposed in assembling other materials with interference fits to lubricate the adjoining interfering surfaces to assist in pressing the one into the other without the use of heat. Thus, a rubber ring can be assembled over a metal shaft with an interference fit by placing a small quantity of oil on one of the surfaces prior to pressing them together. In this case the difficulty is not so much in the interference fit, since the rubber is resilient and can be expanded over the shaft. It is rather in the very high friction created between the rubber and metal under the interference fit conditions. The oil reduces the friction and permits the rubber to be slid over the metal surface.

In the case of metal and ceramic interference fits, however, oil will not suffice as a lubricant. The ceramic is a granular substance and even where smoothly finished, it presents a very irregular profile to the metal consisting of sharp peaks and valleys. Oil placed on the ceramic surface is rubbed off the peaks which then embed themselves into the metal and resist sliding movement between the ceramic and metal surfaces.

It has also been proposed to use a latex paint between two interfering surfaces such as a brass cylindrical surface pressed into a steel or cast iron recess, largely to form a seal between them rather than to lubricate them as they are being assembled. Latex paint, however, cannot lubricate interfering ceramic and metal surfaces since the latex is scraped off by the peaks in the ceramic and is thereafter useless as a lubricant.

I have discovered that a metal band or retainer can be assembled over a ceramic mating ring or the like with an interference fit and without the use of heat to expand the metal band or retainer, the assembly being effected by coating the ceramic-metal interface with a lubricant comprised of solid particles mixed into a paste-like consistency with a liquid carrier. The particles must be softer than the ceramic so as to deform around the peaks, but yet hard enough not to run off. Where the mating ring is to be lapped after assembly with the ceramic, the particles must be readily removable from the lapping disc of the lapping machine.

I have discovered further that a lubricant made from polytetrafluoroethylene particles in a water carrier, preferably of a paste-like consistency, satisfied all of the conditions for an interference fit assembly. Although this material is a non-stick material and, hence, would be thought to be unsatisfactory to coat the peaks of the ceramic surface granules, I have found that by using the material in a heavy consistency, the valleys between peaks are filled with the particles so that those which would be scraped off during the assembly process have nowhere to go and, hence, are pressed against the peaks to act as a lubricant.

The polytetrafluoroethylene particles can readily withstand temperatures of 300°F. to 400°F., they are chemically inert and they do not embed themselves in the lapping disc in a manner making it difficult to remove them.

A suitable commercially available lubricating material is DuPont TFE and FEP Non-Stick Coating sold under the DuPont trademark "Teflon". This material contains modifiers to promote adhesion to most surfaces, has high heat stability, a low coefficient of friction and is inert to almost all chemicals.

The novel combination of coating and granular material and various applications are shown in the accompanying drawings in which:

FIG. 1 is a fragmentary section through a surface portion of a granular material to which the coating has been applied;

FIG. 2 shows a pair of rings in section which are to be assembled, one within the other, the inner one being coated in accordance with this invention and having an interference fit with the other;

FIG. 3 shows the rings of FIG. 2 in assembled relation;

FIG. 4 shows a cross-section through an annular metal stamping of special design and through a ceramic ring which is to be press-fitted into the stamping, with the coating of this invention applied to the interfering surfaces;

FIG. 5 shows the stamping and ceramic ring of FIG. 4 assembled to form a ceramic primary sealing ring for a rotary mechanical seal;

FIG. 6 shows the assembly of FIG. 4 pressed into a seal cavity in a housing;

FIG. 7 shows the assembly of FIG. 4 pressed upon a shaft;

FIG. 8 is a radial section through a ceramic ring coated in accordance with this invention and pressed into a rubber sealing ring; and FIG. 9 is a special adaptation of the ceramic ring coated in accordance with this invention wherein an intermediate similarly coated ring is used to reduce the effect of extreme differences in coefficients of expansion between the ceramic ring and a housing.

Referring now to FIG. 1, there is shown a fragment 10 of a granular hard material such as ceramic which is to be pressed into a cavity or opening in another material. The outer surface 11 of fragment 10 when magnified or delineated by a profilometer is irregular as shown, the irregularities representing the outer boundary surfaces of the crystals of grains of which the material is composed. The irregularities, when coated with an ordinary lubricant such as an oil or a grease do not retain the lubricant, particularly at the peaks of the irregularities. The lubricant is wiped off and penetrated by the peaks to gouge an interfering surface of metal slid over it. This produces excessive resistance to the assembly and a likelihood of breakage of the frangible ceramic, which makes necessary a heat shrinking type of assembly operation instead of a simple pressing operation.

In accordance with this invention, the surface 11 is coated with polytetrafluoroethylene particles 12 which are held together in a paste-like composition with water and a modifier to promote adhesion to the peaks of the irregular surface 11. Particles 12 behave somewhat like rubber particles in that they are incompressible and because of the modifier they are not displaced from the peaks, but are deformed to fill the valleys. Since polytetrafluoroethylene is inherently waxy or slippery, it provides its own lubricant for the passage of the coated surface into an interfering metal surface.

If the interfering surfaces are not perfectly matched, i.e., one is slightly out of round, the coating will accommodate this condition and "cold flow" from the region of closer or maximum interference to the region of least interference. When the articles to be press-fitted together are a ceramic primary sealing ring and a rotatable retainer for holding the ring, the fit between the ring and retainer must be fluid-tight as well as one which will prevent the ring from cracking under centrifugal force or localized heating. The coating will not only permit assembly of a ring and retainer without the aid of heating and cooling cycles, but will provide a fluid-tight seal between the ring and retainer over a wide range of temperatures.

In FIG. 2 are shown a ceramic ring 13 and a rotatable apertured housing 14 of cast iron or the like into which the ceramic ring is to be press-fitted. Ceramic ring 13 has, in the illustration of FIG. 2, a rectangular radial cross-section and a cylindrical outer surface 15. A coating 16 of the type shown at 12 in FIG. 1 has been applied to cylindrical surface 15. Housing 14 has a cylindrical bore 17 which is slightly smaller than the diameter of outer surface 15 so that normally housing 14 would have to be expanded by heat to permit ring 13 to be pressed into bore 17. However, with polytetrafluoroethylene coating 16 applied to surface 15, ring 13 is assembled into bore 17 by a simple axially directed pressing operation. The assembled ring 13 and housing 14 are shown in FIG. 3. It may be noted that coating 16 is not scraped off surface 15 incident to the pressing operation as would be the case with a latex or other rubber coating, but coating 16 remains on surface 15 to provide lubrication to surface 15 and to effect a fluid-tight seal between bore 17 and surface 15.

If the radial surface 18 of ceramic ring 13 is to be used as an end face sealing surface of a rotary mechanical seal, then the insertion of ring 13 into bore 17 is halted at about the point shown in FIG. 3 so that the sealing surface 18 is exposed for lapping or other final surface finishing operations.

Another application of the coating of this invention is shown in FIGS. 4 and 5. In FIG. 4 are shown a ceramic ring 19 which is to be mounted in a rotating stamped retainer 20 of metal such as brass. Ring 19 is of substantial rectangular radial cross-section having a given radial dimension A. Retainer 20 has concentric cylindrical walls 21 and 22 connected by a radial wall 23. Outer wall 21 has a small flange 24 which serves as a radius to make easier the insertion of ring 19 into retainer 20. Said ring has an outer cylindrical wall 25 which has an interference fit with the interior surface of cylindrical wall 21. To make the assembly of ring 19 into retainer 20 easier, surface 25 is coated with polytetrafluoroethylene particles 25, as described above.

It may be noted that radial dimension A of ring 19 is less than radial dimension B of the interior of retainer 20 so that when ring 19 is assembled into retainer 20 as shown in FIG. 5 there is considerable clearance between ring 19 and inner cylindrical wall 22. However, a fluid-tight seal has been established between ring 19 and retainer 20 by the coating 26 applied to outer cylindrical wall 25 on ring 19.

The purpose of the concentric retainer walls 21 and 22 is shown in FIGS. 6 and 7. In FIG. 6 wall 21 is press-fitted into a cylindrical recess 27 in a hub 28 of an impeller or the like pressed upon and rotatable with a shaft 29. Flange 24 may serve to limit the movement of retainer 20 into recess 27. The press fit between recess 27 and wall 21 of retainer 20 may also be lubricated with polytetrafluoroethylene particles to facilitate the assembly of retainer 20 into recess 27.

If it is desired that ring 19 be mounted directly on shaft 29 independently of hub 28 so that said hub need not be formed with a recess, the cylindrical wall 22 of retainer 20 is pressed upon a shaft 29' as shown in FIG. 7, wall 22 having an outwardly directed flange 30 or radius to facilitate such assebmly. The polytetrafluoroethylene lubricant of this invention may be applied to the shaft-contacting surface of wall 22 to facilitate such assembly.

The assembly of FIG. 5 is most useful as a primary seal of a rotary mechanical seal, radial surface 31 on ring 19 serving as the end face sealing surface of the ring. Said ring 19 is axially longer than walls 21 or 22 so that radial sealing surface 31 is disposed beyond the ends of walls 21 and 22. This arrangement makes surface 31 readily accessible for a flat lapping operation, and since the opposite radial surface 32 is covered by radial wall 23 of retainer 20, there can be no error in determining which surface of ring 19 is to be lapped and which way the retainer 20 is to be installed, either in cavity 27 or on shaft 29 as may be the case where a simple band is used to protect the ceramic ring from radial disintegration as shown in my prior U.S. Pat. No. 3,782,735.

Another use for the lubricating qualities of the coating of this invention is illustrated in FIG. 8. In that figure a ceramic ring 33 is shown mounted in a bore 34 in a housing 35, the ring 33 being a part of a rotary mechanical seal (not shown). In this case, however, instead of an interference fit between ring 33 and housing 35, ring 33 is press-fitted into a rubber O-ring 36 mounted in a groove 37 in housing 35. Ordinarily, such press fit would not be acceptable and fluid-tight since the friction between the ceramic outer wall 38 and rubber O-ring 36 would cause the O-ring to be dragged with the ceramic to a partial displacement of the O-ring out of its groove 37.

Surface 38 of ceramic ring 33, however, is coated with the polytetrafluoroethylene particles 39 and these particles shield the irregularities in the ceramic surface 38 from the O-ring and also provide lubrication for said surface 38 so that ring 33 can be readily press-fitted into O-ring 36 without unduly distorting said O-ring In yet another modification an extreme difference in coefficients of expansion of a ceramic ring and a housing into which it it to be press-fitted can be compensated for with the aid of the coating of this invention. This modification is shown in FIG. 9. The housing 40 there shown is of aluminum, and the ceramic ring is shown at 41 and is to be press-fitted into a counterbore 42 in housing 40. If it is assumed as an example that ceramic ring 41 has an outer diameter of 1.5 inches, an allowable interference fit of 0.001 inch and that the ring and housing will be subjected to temperature variations of 70°F. to 400°F, it can be shown that if the allowable interference fit of 0.001 inch is to be had at 400°F. then the interference fit at room temperature of 70°F. would be 0.008 inch, taking Tolerance on bore at 0.005 inch
Tolerance on ceramic diameter at 0.001 inch
Coefficient of expansion of aluminum at $13 \times 10^{-6}$/°F.
Coefficient of expansion of ceramic at $3.4 \times 10^{-6}$/°F.
Such interference would be excessive and unacceptable.

The solution to the problem of excessive interference fit is shown in FIG. 9. It comprises inserting a buffer ring 43 between ring 41 and counterbore 42, said ring 43 having a coefficient of expansion which is between the coefficients of ring 41 and counterfore 42. Ideally, the coefficient of expansion of ring 43 should be midway between the coefficients of ring 41 and counterbore 42. This reduces the differential in dimension between rings 41 and 43 to an acceptable maximum, the same differential obtained between ring 43 and counterbore 42. This ideal, however, cannot always be attained since the selection of the material of the buffer ring is limited by the conditions under which the buffer ring is to operate.

Assuming the same aluminum bore as before, the ceramic ring outer diameter and the inner diameter of buffer ring 43 may be selected to provide the allowable minimum expansion at 70°F. of 0.001 inch. In one example, using a coefficient of expansion for cast iron of $6 \times 10^{-6}$/°F., counterbore 42 diameter of $1.4994 \pm 0.0005$ inch, and an outer diameter for cast iron buffer ring 43 of $1.5028 \pm 0.0005$ inch, the inner diameter of buffer ring was 1.1023 inch, and the outer diameter of ceramic ring 41 was 1.10336 inch. This provided an allowable interference fit of 0.001 inch between the ceramic and buffer rings.

Ring 43 in FIG. 9 thus can be made of cast iron, and the coating of this invention can be applied to the outer cylindrical surfaces 44 and 45 on rings 41 and 43, respectively. With such coatings, ceramic ring 41 can be pressed into buffer ring 43, and buffer ring 43 can then be pressed into counterbore 42. Ring 41 may be a primary sealing ring of an end face rotary mechanical seal. The coatings in this case provide the necessary fluid-tight seals between rings 41 and 43, and betteen ring 43 and counterbore 42.

I claim:

1. As an article of manufacture a composite ring comprising an inner ring and an outer ring, said inner and outer rings each having a cylindrical surface in contact with a cylindrical surface of the other ring to form an interface, the surface of the inner ring being comprises of a brittle granular material, and a layer of polytetrafluoroethylene particles interposed between said inner and outer rings at the interface, the rings having an interference fit at the said interface and said polytetrafluoroethylene particles lubricating the interface during the assembly of the inner and outer rings and providing a fluid-tight seal at said interface.

2. An article as defined in claim 1, said outer ring being made of metal and said inner ring surface in contact with the outer ring being made of ceramic material.

3. An article as defined in claim 2, said inner ring being made of ceramic material.

4. An article as defined in claim 3, said outer ring being made of cast iron.

5. An article as defined in claim 1, said outer ring having a surface of an elastomeric material at said interface.

6. An article as defined in claim 5, said outer ring being made of metal and having a concentric groove formed in the inner surface thereof, and said elastomeric material comprising an O-ring retained in said groove.

7. An article as defined in claim 1, said composite ring being subjected to temperature variations of from 70°F. to 400°F., said outer ring being comprised of a metal, said inner ring being comprised of cast iron and having a cylindrical inner surface, and a third ring within the inner ring and having a cylindrical surface in contact with the cylindrical surface of the inner ring to form an interface therewith, and a layer of polytetrafluoroethylene particles interposed between the inner and third rings at the interface therebetween, said polytetrafluoroethylene particles lubricating the interface during the assembly of the inner and outer rings and providing a fluid-tight seal at said interface, said inner ring being a coefficient of thermal expansion which is between the coefficients of thermal expansion of the outer and third rings.

8. An article as defined in claim 7, said outer ring being made of aluminum, said inner ring being made of cast iron and said third ring being made of ceramic.

* * * * *